United States Patent

[11] 3,631,536

[72] Inventor John A. Mosman
295 Edgewood Drive, Pacifica, Calif. 94044
[21] Appl. No. 735,683
[22] Filed June 10, 1968
[45] Patented Dec. 28, 1971

[54] REGISTER SYSTEM MEMORY MODULES
2 Claims, 4 Drawing Figs.

[52] U.S. Cl. .......... 340/172.5, 340/286
[51] Int. Cl. .......... G08b 5/22
[50] Field of Search .......... 340/172.5, 286

[56] References Cited

UNITED STATES PATENTS

| | | | |
|---|---|---|---|
| 3,155,957 | 11/1964 | Parissi et al. | 340/286 |
| 3,175,198 | 3/1965 | Burns, Jr. | 340/173.1 |
| 3,214,747 | 10/1965 | Lurie | 340/286 |
| 3,228,020 | 1/1966 | Gassenheimer et al. | 340/286 |
| 3,254,335 | 5/1966 | Staten | 340/286 |
| 3,353,173 | 11/1967 | Beilfuss | 340/286 |
| 3,274,566 | 9/1966 | McGrogan | 340/172.5 |
| 3,436,734 | 4/1969 | Pemerene et al. | 340/172.5 |

*Primary Examiner*—Raulfe B. Zache
*Assistant Examiner*—Mark Edward Nusbaum
*Attorney*—Townsend and Townsend

ABSTRACT: Interchangeable memory modules for electronic in-out register systems, each module having a plurality of memories uniquely addressable from remote stations for control and interrogation of the memory states, and display means for displaying states of each of the memories. The modules are arranged in an illuminated name and memory state panel display.

INVENTOR
JOHN A. MOSMAN
BY
Townsend and Townsend
ATTORNEYS

REGISTER SYSTEM MEMORY MODULES

This invention relates to new and improved interchangeable memory modules for electronic in-out register systems, such as used in hospitals.

Electronic in-out register systems have been developed for use in hospitals and other large institutions comprised of a central storage memory having memory units uniquely addressable from remote stations such as telephone dial stations, for interrogation and control of the state of the memory elements in each unit. In operating such register systems, access to a particular memory unit from a remote telephone station is accomplished by dialing a unique sequence of digits corresponding to a particular memory unit address. The memory unit may then be controlled to store information such as whether a doctor is present in the hospital, his location, and whether or not there are any messages for him. The state of each of the memory elements within a memory unit may also be sensed or interrogated from each of the remote telephone stations. Thus, the information stored in the memory units may be obtained from remote stations without calling the switchboard operator.

It is also generally desirable to provide some type of illuminated panel display near the switchboard operator at the main desk of the hospital or other institution for immediate visual access to the information stored in the memory units such as whether a particular doctor is in or out, his location, and whether there is a message for him. In present systems, the visual status display panel provides an alphabetical directory and is either an entirely separate system from the telephone station register system, or wired directly to the storage memory of the register system. In the former case duplication of equipment and control is required while in the latter, a change in personnel and consequent change in the alphabetical directory requires rewiring of the illuminated panel display.

It is an object of the present invention to provide compact memory modules which provide at the same time a memory storage of uniquely addressable memory units and an illuminated name and memory state panel display for electronic in-out register systems.

Another object of the invention is to provide a plurality of interchangeable memory modules so that the illuminated panel display may be continuously maintained as an alphabetical directory without the necessity of rewiring the display panel. A feature and advantage of the invention is that the memory modules may be positioned in any location on the display panel yet provide uniquely addressable memory units for storing and displaying information.

According to the invention, a memory module is provided comprising a plurality of binary memories each including a lamp for displaying the state of the memory. The binary memories are arranged in a row along the front of a circuit board for plug-in into locations on a display panel housing. The circuit board includes a plurality of electrical circuit lines terminating along the rear edge of the board in a plurality of electrical terminals for electrical contact with complementary terminals in a display panel housing leading to the rest of the electronic in-out register system. Between the electrical circuit lines and the binary memories there is interposed a relay responsive to signals from only certain of the electrical circuit lines corresponding to a unique address to provide electrical connection between the binary memories and certain other of the electrical circuit lines for control and interrogation of the memory states from remote stations.

The lamps associated with each binary memory are arranged in a linear array across the front of each memory module. At least one of the lamps is set back within a curved recess for projecting light on and illuminating a name label positioned across the front of the memory module. Other suitable labels may be positioned in front of the other lamps for visual determination of the state of the binary memories.

In any particular memory module, the printed electrical circuit lines which will activate the relay providing access to the binary memories may be changed to provide a desired predetermined address for the memory module. Access to the binary memories from a remote station may be accomplished only by specifying the unique address which will activate the relay connecting the remote station to the binary memories for control and/or interrogation.

At the same time the binary memories provide a visual display on the alphabetical display panel of the names and memory states. The modules may be interchanged in the locations in the display station housing in order to maintain alphabetical order. Whatever its location, access to the memory module from a remote station may be accomplished by specifying the appropriate predetermined address.

Other features and advantages of the present invention will become apparent in the following specification and accompanying drawings.

Figures 1, 2:
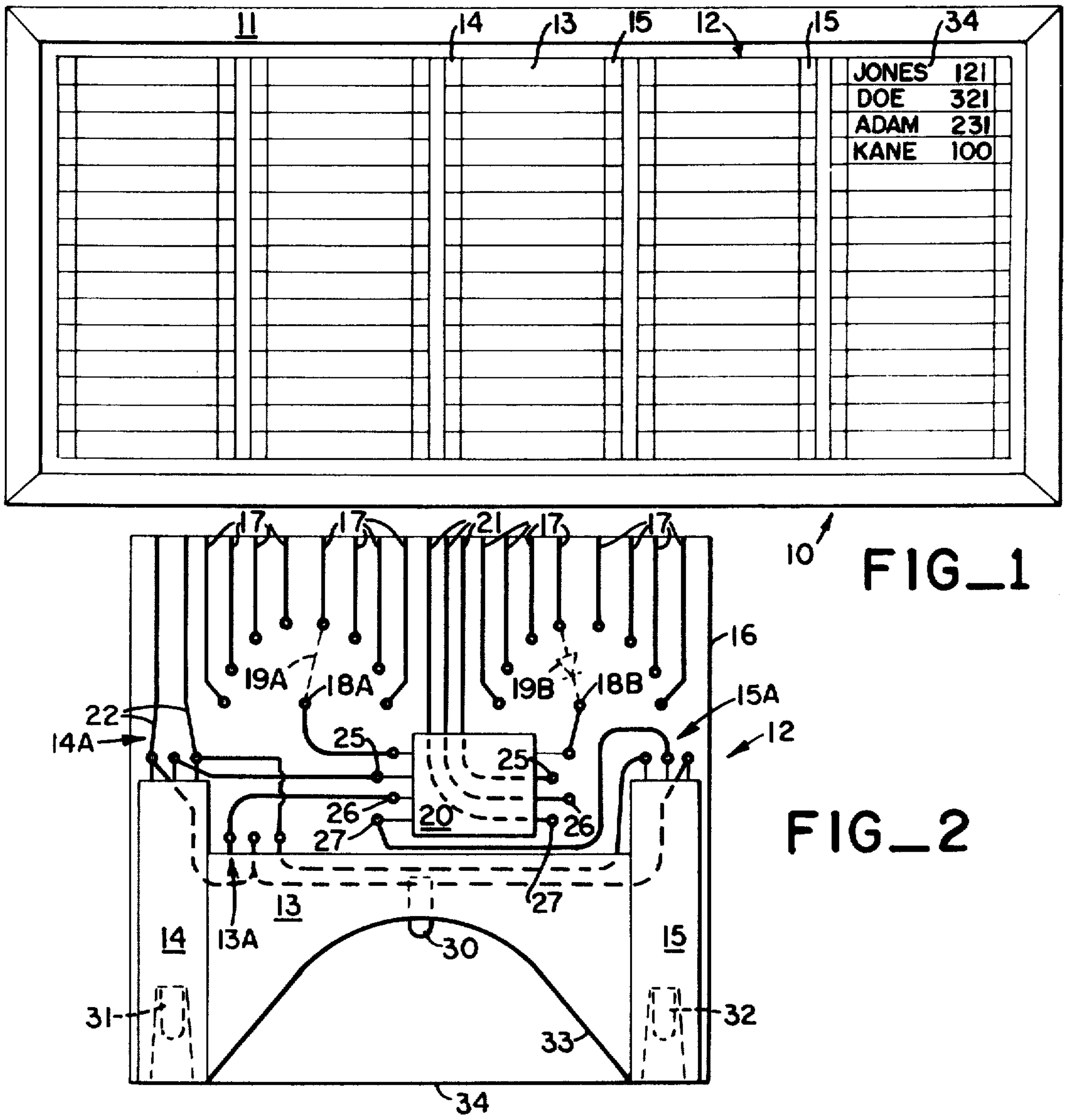
FIG. 1 is a front view of an illuminated name and memory state panel display embodying the present invention.
FIG. 2 is a plan view of a memory module from the panel display illustrated in FIG. 1.

In the embodiment of the present invention illustrated in FIG. 1 there is provided an illuminated name and memory state panel display 10 for use in an electronic in-out register system. The panel display would be mounted at the main desk of a hospital or other institution for immediate visual access by the switchboard operator. The display panel 10 is comprised of a housing 11 having locations for a plurality of memory modules 12. Each module 12 includes three binary memories 13, 14 and 15 for storing and displaying information. A label having the name of a doctor or other personnel and associated code number printed thereon is illuminated by the memory 13 if the doctor is in. The memories 14 and 15 may provide illumination if a message is waiting for the doctor, or if the doctor is in surgery or some other location, respectively. The binary memories may be used for indicating any desired information status.

As illustrated in FIG. 2, the memory module 12 is formed from a printed circuit board with the binary memories 13, 14 and 15 arranged in a row across the front of the printed circuit board 16. A wired circuit board could also be used. The printed circuit board 16 is provided with a plurality of printed electrical circuit lines 17 terminating in a plurality of electrical terminals along the back edge of the printed circuit board. Only certain of the printed electrical circuit lines 17 are connected through terminals 18A and 18B to a relay 20. The printed electrical circuit lines 17 connected to the terminals 18 determine the unique address for the memory module. The relay 20 controls three switches for providing access to the binary memories 13, 14 and 15 through other printed electrical circuit lines 21. Thus, when the appropriate address is specified, the relay 20 is activated to close the three switches across terminals 25, 26 and 27, thereby providing access to the binary memory through the printed electrical circuit lines 21. The state of the binary memories may then be sensed and controlled through the printed electrical circuit access lines 21.

By way of example, to provide the memory module with a unique address, the terminal 18A is connected to a circuit line 17 as indicated by the dotted line 19A. The terminal 18B is connected to another circuit line 17 by diode 19B indicated in dotted lines.

Each of the binary memories 13, 14 and 15 includes a lamp 30, 31 and 32, respectively, for displaying the state of the respective memory through the front of the memory module. The lamp 30 is set within a curved recess 33 for projecting light upon a name and code number label 34. The code number specifies the unique address for the memory module. Memory 13 may be utilized for registering the in-out status of the named individual. Thus, the name and code number are illuminated when the individual has registered in from a remote station and unilluminated when the individual has registered out. The memory 14 and lamp 31 may be used to indicate, for example, whether or not a doctor is in surgery or at some other location while the memory 15 and lamp 32 may be used to indicate that a message is waiting for the named individual.

Figure 3:
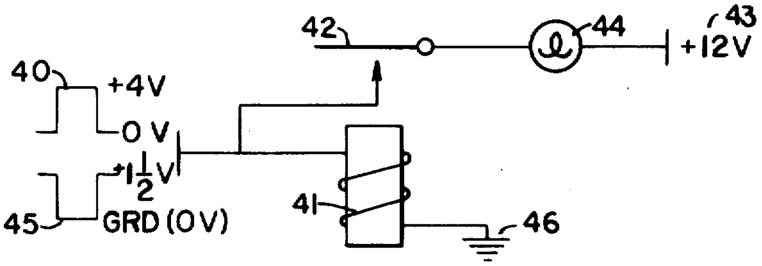
FIG. 3 is a detailed schematic diagram of a binary memory and display lamp utilized in the memory module of FIG. 2.

As illustrated in FIG. 3, each of the binary memories is a solenoid activated reed switch which provides a two-state memory. When a 4-volt pulse 40 is applied at the input to solenoid 41, the reed switch 42 is closed permitting current from a 12-volt source 43 to pass through the lamp 44 and solenoid 41 to ground thereby maintaining the reed switch in a closed state and illuminating the lamp 44. A ground pulse 45 applied at the input to the solenoid 41 diverts the current from the 12-volt source 43 deactivating the solenoid 41 and opening the reed switch 42. The switch then remains at an open position and the lamp 44 remains off. The binary memories are thus controlled by 4-volt pulses or ground pulses applied through the printed circuit lines 21 when the relay 20 is closed. The 12-volt source 43 and ground 46 to solenoid 41 may be applied through the printed electrical circuit lines 22 respectively of the module illustrated in FIG. 2.

Each of the binary memories 13, 14, and 15 is thus provided with a set of three terminals labeled respectively 13*a*, 14*a* and 15*a*. One terminal from each set is connected to one of the lines 22 for application of the 12-volt source. A second one of the terminals in each set is connected to the other line 22 for connection to the ground voltage. The third terminal in each set is connected via relay 20 to one of the three lines 21 for access to the memory. Thus, the memory 13 is connected to terminal 26 of the relay, the memory 14 is connected to terminal 25 of the relay, and the memory 15 is connected to terminal 27 of the relay. When the relay is activated to a closed position the three electrical circuit lines 21 are connected to the respective terminals 26, 25 and 27 providing access to the three memories along the lines 21.

Figure 4:
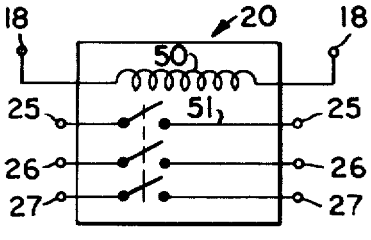
FIG. 4 is a detailed schematic diagram of the relay utilized in the memory module illustrated in FIG. 2.

As illustrated in FIG. 4, the relay 20 comprises a solenoid 50 connected across the terminals 18 for activation when the appropriate address is specified through the printed electrical circuit line 17. The activated solenoid 50 closes three reed switches 51 connected across terminals 25, 26 and 27 providing access to the binary memories 13, 14 and 15 through the printed electrical circuit lines 21.

In order to sense the state of the respective binary memory elements, the presence or absence of current passing from 12-volt source 43 through the solenoid 41 may be detected. A high resistance detector such as a volt meter connected across the solenoid registers, for example, a 1.5-volt signal when the switch 42 is closed and 0 volts when the switch is open with no current passing through the solenoid 41 from the 12-volt source 43.

Because the binary memory is constructed from a low impedance circuit, there are no voltage or current surges thereby resulting in long life for the lamp 44. The cold impedance of the lamp is approximately 15 ohms.

In operating an electronic in-out register system embodying the present invention, a unique address specified at a remote station such as a telephone dialing station, is processed by an addressing selection matrix to provide a signal at the appropriate printed electrical circuit lines of the specified memory module. The relay 20 is activated and the switches closed to provide access to the binary memories through the printed electrical lines 21. Additional digits specified at the remote station are processed by a control function matrix and storage unit or sensing function matrix and storage unit for either control or sensing respectively of the states of the binary memories. A time-shared scanner may also be included in the system for efficient access to the memory modules from a plurality of remote stations. An electronic in-out register system in which the present invention is applicable is fully set forth in U.S. Pat. No. 3,092,689. This system includes a central storage memory having memory units uniquely addressable from remote telephone dial stations which provide access to the memory units for interrogation and control of the state of the memory elements in each unit. An earlier register and indicating system is described in U.S. Pat. No. 2,330,358.

It is apparent that other types of memories than binary memories may be used in the present invention. Furthermore, in the case of binary memories, a variety of two state elements other than the solenoid activated reed switch described herein may also be used. The number of memories used, of course, depends upon the information sought to be stored and displayed.

The present invention is applicable to a variety of electronic register and status systems in addition to electronic in-out register systems. Thus the invention may be used in bed status panel display systems for hospitals, register systems in hotels, and electronic register system for use generally in large institutions.

What is claimed is:

1. A removable and replaceable memory module for electronic register systems comprising: a circuit board; a plurality of binary memories each including lamp means for displaying the state of the memory arranged in a row across the front end of said circuit board, said circuit board formed with a curved recess along the front end thereof in which one of said lamps is positioned and across which is positioned a label with indicia printed thereon for illumination by said lamp; a first set of circuit lines terminating at one end in a plurality of electrical terminals along the back end of the circuit board for electrical contact with complementary terminals in the electronic register system; a second set of circuit lines terminating at one end in a plurality of electrical terminals along the back end of the circuit board for electrical contact with complementary terminals in the electronic register system; and relay means coupled to certain of the circuit lines of said first set of circuit lines corresponding to a unique address, said relay connectable to different of said first set of circuit lines for changing the unique address of the memory module, said relay means responsive to signals over the circuit lines of said first set of circuit lines corresponding to the unique address for providing electrical connection between the binary memories and the second set of circuit lines, said second set of circuit lines providing means for controlling the states of the binary memories and for sensing without changing the states of the binary memories.

2. An electronic register system of the type comprising a storage memory of a plurality of uniquely addressable memory units, a plurality of remote stations for controlling and sensing the state of the uniquely addressable memory units, and an illuminated name and memory state panel display providing a visual display of the states of the memory units comprising: a display panel housing having a plurality of locations for receiving memory modules, said housing including a plurality of electrical terminals at each location for contact with electrical terminals on a memory module, the electrical terminals at each location in the display panel housing being the same whereby memory modules are interchangeable within the locations in the display panel housing; a plurality of memory modules, each module comprised of a circuit board having a plurality of binary memories arranged in a row across the front of said circuit board including lamp means for displaying the state of each memory, said circuit board formed with a curved recess along the front end of the circuit board in which one of said lamps is positioned and across which a label with indicia printed thereon is positioned for illumination by said lamp, a first set of circuit lines terminating at the back end of the circuit board a plurality of electrical terminals for electrical contact with the complementary terminals at the locations in the display panel housing, a second set of circuit lines terminating at the back end of the circuit board in a plurality of electrical terminals for electrical contact with complementary terminals at the locations in the display panel housing, and relay means coupled to certain of the circuit lines in said first set of circuit lines corresponding to a unique address, said relay means connectable to different of said first set of circuit lines for changing the unique address of the memory module, said relay means responsive to signals on the circuit lines of the first set of circuit lines corresponding to the unique address for providing electrical connection between the binary memories and the second set of circuit lines, said second set of circuit lines providing means for controlling the states of the binary memories and for sensing without changing the states of the binary memories.

* * * * *